March 12, 1968

H. R. LIFFERTH 3,372,766

COMBINATION TRACTIVELY AND THRUST PROPELLED VEHICLE
FOR OFF-HIGHWAY AND ON-HIGHWAY USE AND
TRACTIVE RUNNING GEAR THEREFOR

Filed May 23, 1966

INVENTOR.
HENRY R. LIFFERTH

BY *Mallinckrodt*
*Mallinckrodt*

ATTORNEYS

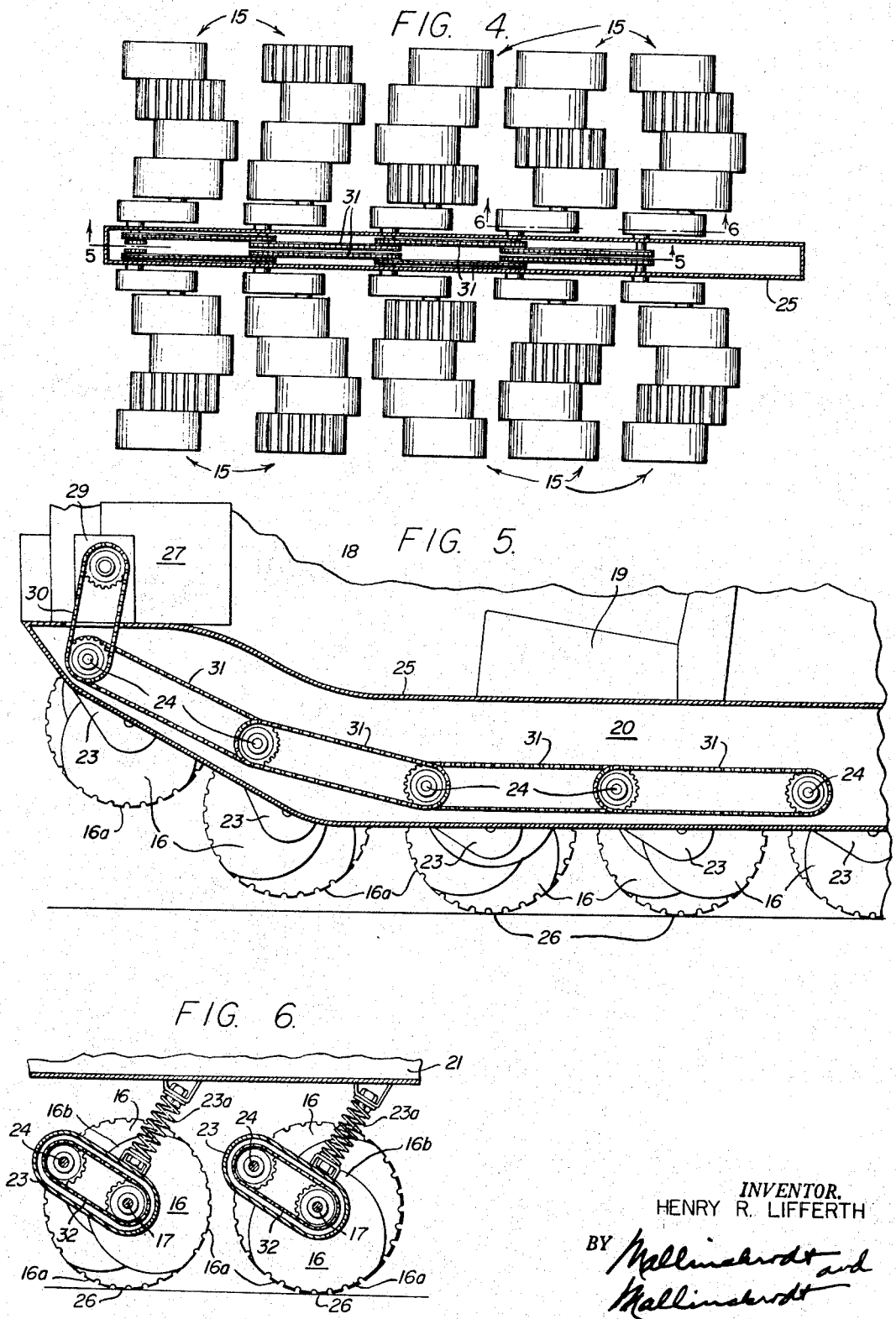

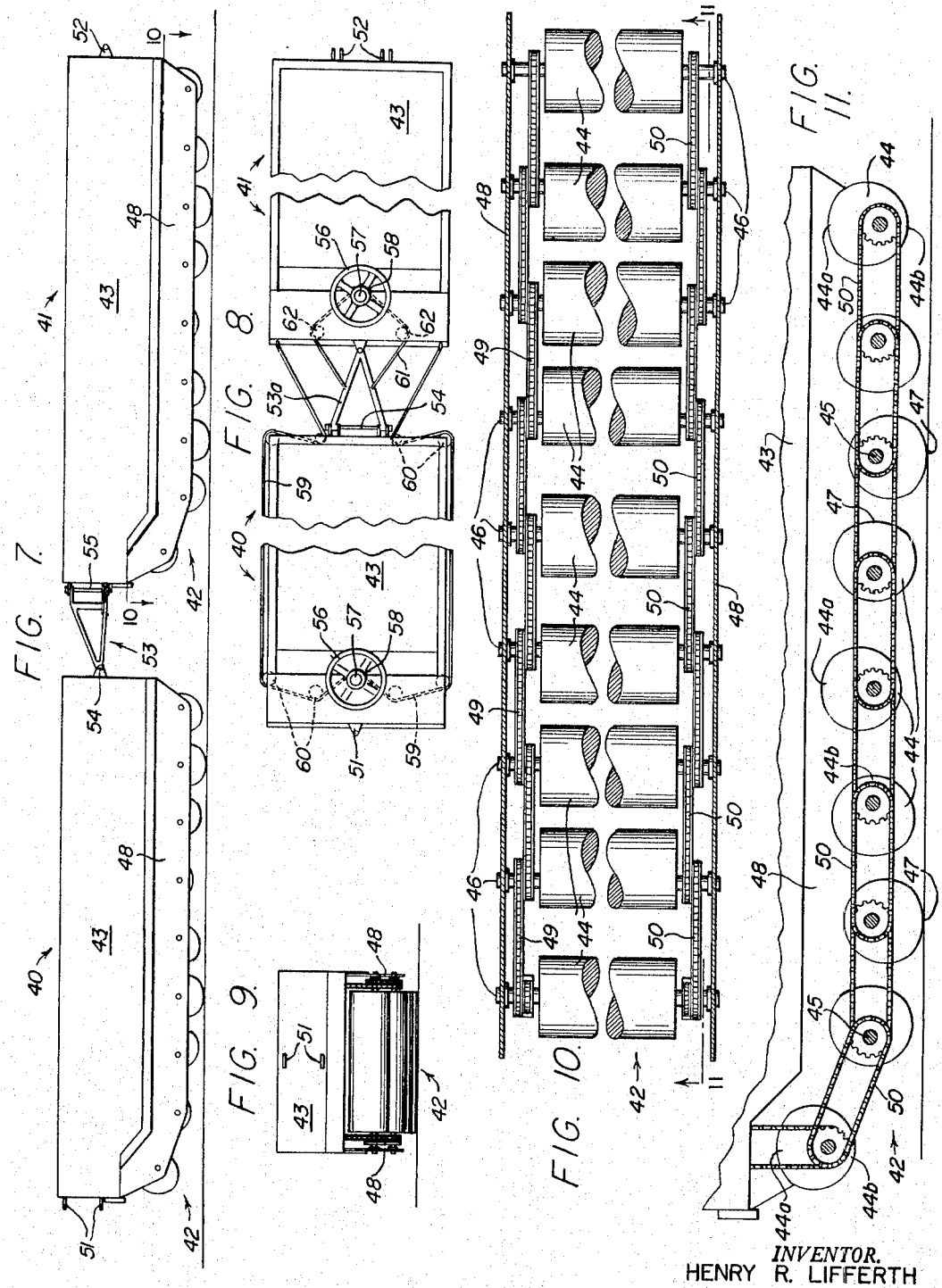

March 12, 1968
H. R. LIFFERTH
3,372,766
COMBINATION TRACTIVELY AND THRUST PROPELLED VEHICLE
FOR OFF-HIGHWAY AND ON-HIGHWAY USE AND
TRACTIVE RUNNING GEAR THEREFOR
Filed May 23, 1966
4 Sheets-Sheet 4
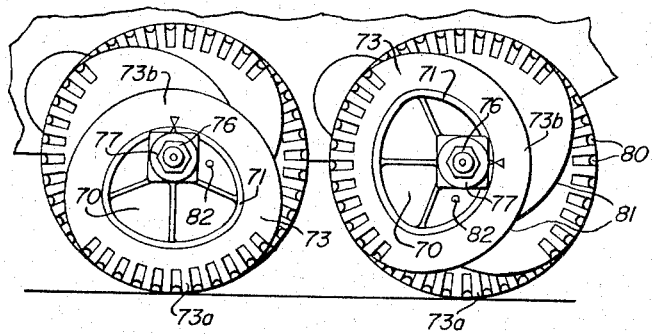
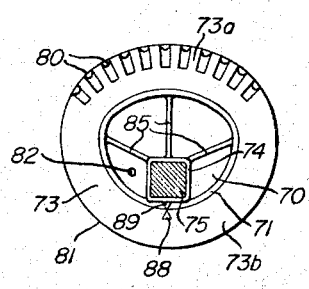
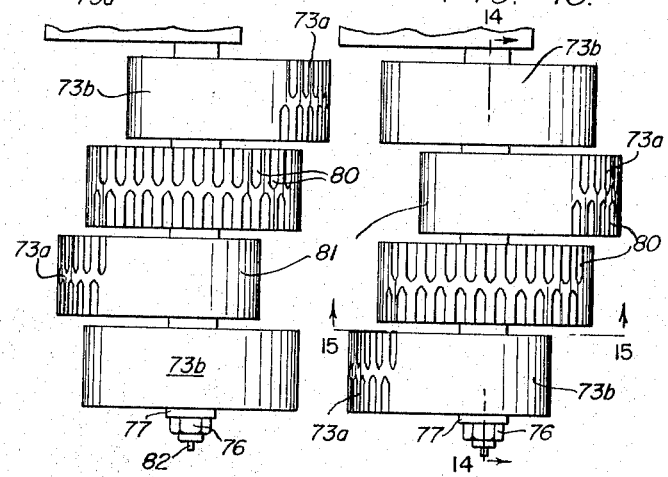
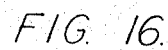
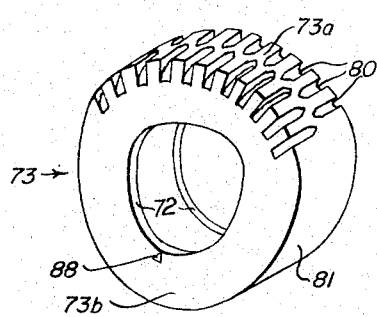
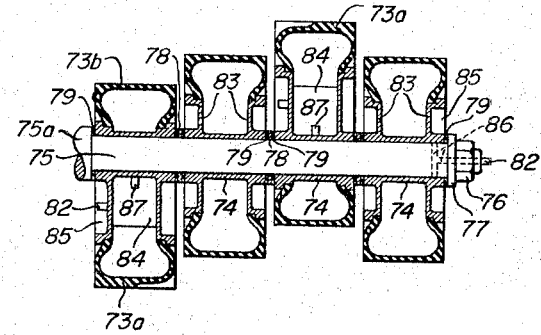
INVENTOR.
HENRY R. LIFFERTH
BY
*Mallinckrodt and
Mallinckrodt*
ATTORNEYS

United States Patent Office 3,372,766
Patented Mar. 12, 1968

3,372,766
COMBINATION TRACTIVELY AND THRUST
PROPELLED VEHICLE FOR OFF-HIGHWAY
AND ON-HIGHWAY USE AND TRACTIVE
RUNNING GEAR THEREFOR
Henry R. Lifferth, Fortine, Mont., assignor to Lifferth
International Corporation, Fortine, Mont., a corporation of Utah
Continuation-in-part of application Ser. No. 356,549,
Apr. 1, 1964. This application May 23, 1966, Ser.
No. 551,970
25 Claims. (Cl. 180—7)

ABSTRACT OF THE DISCLOSURE

An off-highway vehicle, employing both tractive and thrust propulsion for traveling over soft and slippery terrain ash well as on surfaced highways, comprises a series of cam members mounted as propulsive running gear on respective eccentric axes of rotation extending transversely of the direction of travel. The axes may be longitudinally aligned, so the cam members form one or more series extending transversely across the vehicle, with the cam members of each series being arranged side-by-side on a common axis and with the several series being arranged in succession longitudinally of the vehicle, or the axes themselves may be arranged in succession longitudinally of the vehicle, so the cam members are arranged in series longitudinally of the vehicle. The individual cam members are each formed to have a protrusive portion at one side of the mounting axis and a recessive portion at the opposite side. The protrusive portions of the several cam members have arcuate tractive surfaces at substantially equal distances along a radius from the respective axes, and the cam members are so arranged that a plurality of the tractive surfaces are bottomed at all times for vehicle support and tractive propulsion. By making the center of arc of each cam member coincident with the axis of rotation, the vehicle will ride smoothly on hard-surfaced roads. The cam members may be ordinary wheels with offset axes, but are preferably eccentric off-circular wheels having rims mounting eccentric off-circular annular pneumatic tires.

Summary of invention

Figure 1:
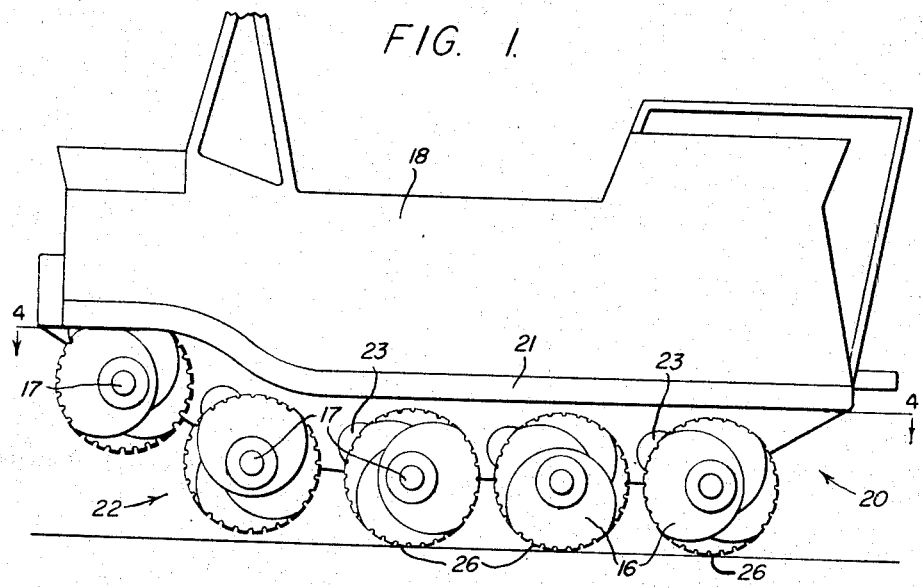

The present application constitutes a continuation-in-part of my allowed copending application, Ser. No. 356,549, filed Apr. 1, 1964, which has been abandoned in favor of this application.

This invention relates to automotive vehicles of type adapted primarily for off-highway use, especially for soft and difficult terrain, such as deep snow or dust, loose sand, swampy ground, mud, and the like.

It relates also to tractive running gear for such a vehicle and to propulsive components thereof, particularly wheels and pneumatic tires therefor.

Various constructions for automotive vehicles of this type have been proposed in the past. Some have been successful for one condition or another and have been built and used in considerable number, but none has been completely satisfactory. Those in need of a versatile vehicle of this kind, for example, the United States Army, have sought in vain for more useful constructions than have been available heretofore.

A primary object in the making of the present invention was to fill this need and to provide a construction having greater applicability to various difficult ground conditions and terrain, as well as to roads and highways, than had been true in the past.

Additional objects were to provide for maximum propulsive contact of the running components of the vehicle with, and for maximum propulsive thrust thereof against, soft and other difficult ground materials while also providing for considerably less yet adequate contact with hard and unyielding road surfaces, so positive travel at practical speeds can be had over such difficult ground materials and so reasonably high speeds can be attained when traveling over surfaced roads and highways; to provide for propulsive thrust in soft materials without in any way relying on traction; to provide for an exceptionally low center of gravity; to provide a lifting action along with the propulsive thrust action, so that running gear will not dig downwardly in soft materials and become mired; to provide an efficient self-cleaning action for the thrust and traction running components; to provide tractive running components that can be constructed and arranged for smooth riding on surfaced highways; and to provide pneumatically inflated tires for such tractive running components.

An important feature of the invention is the use of rotary, cam-like, running members, each having a part of its periphery operative to exert thrust against soft, vehicle-supporting material, e.g. snow, mud, or soft ground, and another part operative to exert traction for normal highway travel. Considered as cams, these running members—component to the running gear of the vehicle—serve as their own followers in the sense that their reaction points are fixed to a movable body, so that the body moves when the cams exercise propulsive thrust with respect to the vehicle-supporting material.

The running gear of the vehicle can be of different types within the purview of the invention. Thus, camming action can be achieved by a series of eccentrically mounted, regularly contoured but diversely oriented rollers appropriately arranged, one behind another, as cams. Again, it can be achieved by one or more rollers, each of which is made up of a side-by-side series of diversely oriented, eccentric, cam configurations. In other words, the eccentric, cam-like running members, can be arranged in series extending longitudinally of the path of travel of the vehicle or in series extending transversely of the path of travel. In some instances, it may be advantageous to use a combination of both.

From a generic standpoint, the running gear of the vehicle is made up of a series of rotary cam members eccentrically mounted on respective axes. If the axes are in longitudinal alignment, with the cam members disposed side-by-side on what is then a common axis, the series will extend transversely of the path of travel. If the axes are arranged one behind another in mutually spaced succession, the series will extend longitudinally of the path of travel on individual axes.

In either instance, each eccentrically mounted cam member has a protrusive portion at one side of the axis merging into a recessive portion at the opposite side of the axis.

The outermost part of the protrusive portion is arcuate, preferably with the cam axis as a center, the length of the arc being dependent upon the number of cam members in the series, and the several cam members are so arranged relative to one another that these arcuate, outermost parts of the protrusive portions are disposed progressively about the respective axes, from one end of the series to the other and at substantially equal radial distances from such axes, to provide successive, tractive, running surfaces at the same level. The arrangement is such that a plurality of these tractive running surfaces are in supporting and running positions at all times. If the center of curvature of the arc of each of these running surfaces is coincident with the cam axis, it makes for rapid and smooth travel over hard-surfaced roads and highways. When the running elements are of pneumatic tire construction, tread surfaces are advantageously provided on the aforesaid arcuate, outermost parts of the protrusive portions. Even when they are of some other construction, e.g. solid rubber, metal, or some other material, a tread design of some kind is often desirable.

The recessive portion and the remainder of the protrusive portion of each cam member are ordinarily also arcuate, and the cam members may even be of circular wheel formation with the cam axis offset from the center of the circle to an extent dependent upon the desired degree of eccentricity; nevertheless, they may be contoured, configured, or otherwise formed as desired so long as the eccentric cam formation is maintained. If the cam members are of circular wheel formation, travel is relatively rough and bumpy because the arcs of the tractive running surfaces of the several cam members of the series do not merge successively during travel to form a true circle. With the arrangement of the several cam members as indicated, the recessive parts of their peripheries are also disposed progressively about the respective axes, from one end of the series to the other, to provide continuously acting, propulsion surfaces between the mutually opposite protrusive and recessive parts, for exerting thrust in soft materials.

It is a preferred feature of the invention that these propulsive thrust surfaces are smooth and slippery, so as to actually slide through soft material with a minimum, if any, adherence of such material thereto. In the construction of the cam members, it would be ideal though not always economically practical to make the arcuate tread surface of the protrusive part frictional, e.g. of rubber, and the remainder of the exposed surfaces antifrictional, e.g. of polyurethane or polytetrafluorethelyne.

The tractive running components are advantageously sets of wheels, uniquely formed as cams and respectively provided with pneumatic tires of similar configuration.

There are shown in ths accompanying drawings specific embodiments of the invention representing what is presently regarded as the best mode of carrying out the generic concepts in actual practice. From the detailed description of these embodiments, other more specific objects and features of the invention will become apparent.

Figure 2:
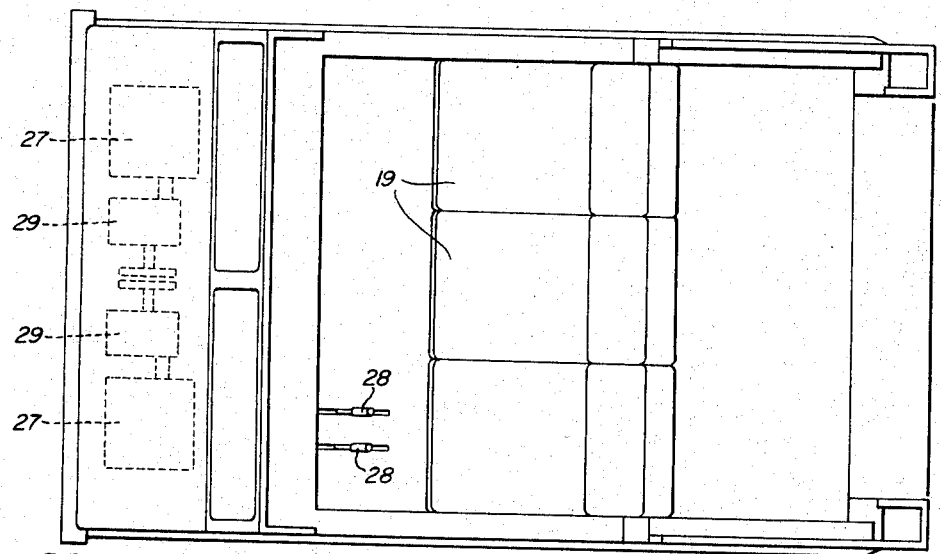
Figure 3:
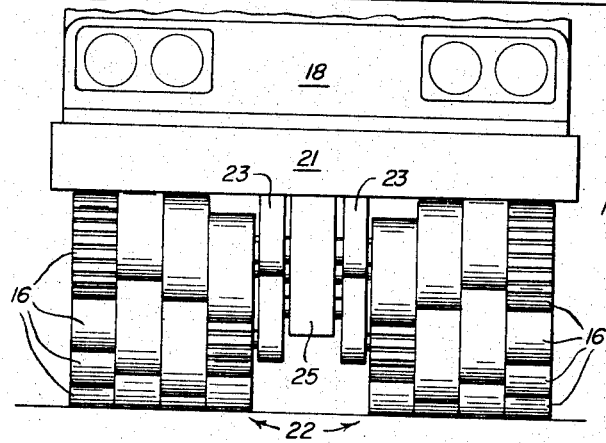

In the drawings:

FIG. 1 is a side elevation of one style of vehicle embodying a preferred form of the invention;

FIG. 2, a top plan;

FIG. 3, a fragmentary front elevation;

FIG. 4, a horizontal section taken on the line 4—4 of FIG. 1, showing the running gear of the vehicle in top plan;

FIG. 5, a fragmentary, longitudinal, vertical section taken on the line 5—5 of FIG. 4 and drawn to a somewhat larger scale to show a portion of the drive mechanism;

FIG. 6, a similar section taken on the line 6—6 of FIG. 4;

FIG. 7, a view corresponding to that of FIG. 1 but showing a different form of the invention and being drawn to a smaller scale;

FIG. 8, a top plan view of the embodiment illustrated in FIG. 7, with intermediate portions being broken out for convenience of illustration;

FIG. 9, a front elevation;

FIG. 10, a view corresponding to that of FIG. 4, but taken on the line 10—10 of FIG. 7, with intermediate portions being broken out for convenience of illustration;

FIG. 11, a view corresponding to that of FIG. 5, but taken on the line 11—11 of FIG. 10;

FIG. 12, a fragmentary view in side elevation corresponding to the lower right-hand portion of FIG. 1 but drawn to a larger scale and showing cam-like pneumatic tires mounted on cam-like wheels in accordance with the invention;

FIG. 13, a view of the same structure shown in FIG. 12 drawn to the same scale but corresponding to the lower-righthand portion of FIG. 4;

FIG. 14, a longitudinal section taken on line 14—14 of FIG. 13;

FIG. 15, a transverse section taken on the line 15—15 of FIG. 13; and

FIG. 16, a perspective view of the pneumatic tire per se.

Referring to the drawings:

In the embodiment of FIGS. 1-6, the cam members are arranged in multiple series at each side of the longitudinal center line of the vehicle, each series 15 extending transversely of the path of travel of the vehicle at one side of the center line thereof, see especially FIG. 4, with the individual cam members 16 thereof being eccentrically arranged and rigidly interconnected side-by-side, on a common axis represented by a stub shaft 17.

In the form illustrated, the vehicle has a body 18, FIGS. 1 and 2, provided with seats 19 for the driver and passengers. Body 18 is supported by an undercarriage 20 comprising a frame or chassis 21 and running gear 22.

Running gear 22 includes five of the individual series 15 of side-by-side mounted cam members 16 on each side of the longitudinal center line of the vehicle, the stub shaft 17 of each series being journaled in bearings provided by mutually opposite side walls of a pivoted suspension arm 23 of box formation, there being an arm 23 for each series pivotally mounted on a shaft 24, FIG. 5, which secures it to a central drive housing 25 that extends longitudinally of the vehicle.

Each cam member 16 is here shown as of curved, eccentric formation, having a protrusive portion 16a and a diametrically opposite recessive portion 16b, the former having the outermost part 26 of its periphery of arcuate contour, with the eccentric axis 17 as a center, to provide a tractive running surface. All of the cam members 16 are similarly formed and similarly mounted, so far as the degree of eccentricity is concerned. Thus, the tractive surfaces 26 are all equal radial distances from the rotative axes.

The several cam members 16 of each series 15 are arranged with the outermost parts 26 of their respective peripheries, i.e. their tractive surfaces, disposed progressively about the eccentrically located axis of rotation 17, from one end of the series to the other, so there will always be at least one tractive surface lowermost. Similarly, the several series are so arranged that those tractive surfaces 26 thereof which are lowermost at any given time provide at least a three-point suspension, and preferably a four or more point suspension, for the vehicle in the common plane of such tractive surfaces at their lowermost positions. As shown, these tractive surfaces are formed with an anti-skid tread design.

The recessive portions 16b of the several cam members of each series are similarly progressively arranged about the eccentrically located, common axis 17, and, consequently, exert propulsive thrusts against soft earth materials, mud, snow, and water, which drive the vehicle forwardly or backwardly, depending upon the direction of rotation. It should be noted that, in either direction, the running gear as so constituted tends to lift the vehicle out of the soft material as the thrust is exerted, rather than digging in as is true with wheels or endless tracks.

The several series on each side of the center line of the vehicle are rotated as a set, in this instance by means of one of two independent and centrally located drive systems. Thus, as shown in FIGS. 2, 4-6, there are two similar engines 27 independently controlled from the driver's seat by respective fuel throttles 28. As shown, the engines are mounted in the front of the vehicle. They could just as easily be located in the rear. Each engine drives a suitable power transmission 29, such as a Salisbury No. 600 V-belt transmission type of torque converter with automatic clutch, which, in turn, drives the several shafts 24, see particularly FIGS. 4 and 5, at one side of the vehicle, serving as drive countershafts as well as suspension pivot shafts, by means of a chain and sprocket drive 30 and a series of chain and sprocket drives 31 in housing 25. These latter, in turn, drive the several transverse series of cam members on the respective sides of the center line of the vehicle by means of respective chain and sprocket drives 32 within the respective suspension arms 23.

Steering of this vehicle is accomplished by driving one engine faster than the other in a manner similar to endless track vehicles.

When a transmission of the type specified is used, the vehicle can be driven only in a forward direction. If reverse is desired, a manually controlled transmission of either mechanical or hydraulic type can be provided, as will be apparent to automotive engineers.

The placement, with respect to eccentricity, of the several cam members 16 of a series of same relative to one another along the axis of the series is not critical, so long as there is a progression of positions in one way or another around the running circumference of the series, although such placement, considered from one series to another longitudinally of the vehicle, is critical, along with the extent of spacing between the leading and the following series, if there is to be a self-cleaning action.

It is convenient to consider the position of the protrusive portion of a cam member 16 as determining the "clock" condition of such cam member, the positions of the several cam members relative to one another being designated as 12, 3, 6, or 9 o'clock positions, when a series is made up of four cam members, as it is here.

The arrangement shown in plan in the upper portion of FIG. 4 and in side elevation in FIG. 5 is, for the first series (left-hand side of drawing top to bottom and considered from the viewpoint of FIG 5), 9, 12, 3, and 6 o'clock. The corresponding arrangement for the second series immediately behind is 12, 3, 6, and 9 o'clock; for the third series, 3, 6, 9, and 12; for the fourth series, 6, 9, 12, and 3; and for the fifth and last series on this same side of the center line of the vehicle, 9, 12, 3, and 6. This means that, for every set of two cam members disposed in tandem in this arrangement, the first one in the direction of travel will bottom first and the two will be self-cleaning, given the close series spacing shown.

If the arrangement is the reverse, then, for every set of two cam members disposed in tandem, the second one in the direction of travel will bottom first and the two will not be self-cleaning.

It is preferable for most purposes that the running gear of the vehicle be self-cleaning, as can be readily appreciated, although there may be instances where this normally advantageous feature of the invention is immaterial. In those instances, it will, of course, make no difference which arrangement is utilized, nor how great the series spacing is.

Self-cleaning is accomplished by reason of the fact that the two cam members of a tandem set converge as they rotate in the same direction, the confronting convergent surfaces thereof passing each other in opposite directions and exerting a wiping action which tends to rid such surfaces of excessive adherent mud. It will be realized that if the gap between the two cam members of the tandem set is too wide, there will be no effective cleaning action. The maximum permissible width of gap for self-cleaning purposes will vary somewhat depending upon the diameter of the cam members and the nature of the soft material to be encountered in travel. Generally speaking, the width of the gap should not be more than a few inches if effective self-cleaning is desired.

It should be understood that the individual cam members 16 of a series 15 of same can be made integral with one another or can be made as separate units rigidly secured together in some suitable manner. They may be made of any suitable material in any suitable form, solid, hollow, or pneumatically inflated, and may be provided with anti-skid tread faces of any customary tire tread design on their tractive surfaces 26.

The embodiment of the invention illustrated in FIGS. 7–11 has only one series of individual cam members for each of its two articulatively coupled sections 40 and 41. Each series is designated 42 and extends longitudinally of its corresponding vehicle section, 40 or 41, which includes a body 43 and chassis and propulsive running gear as described hereinafter.

The running gear of each of the vehicle sections comprises a plurality of elongate rollers 44 eccentrically mounted on respective rotative axes 45, which extend transversely of the direction of travel of the vehicle, one behind another in mutually spaced succession.

As illustrated, each cam roller or member 44 is configurated about its periphery in essentially the same manner as a cam member 16 of the foregoing embodiment, so as to have a protrusive portion 44a and a recessive portion 44b on respectively opposite sides of the eccentrically disposed axis 45, which is represented by stub shafts 46 projecting from opposite ends of the roller, and so as to have an arcuate tractive surface 47.

The stub shafts 46 of the several cam rollers 44 are journaled in hanger plates 48, depending from the body 43 at respectively opposite sides thereof and extending along the length thereof.

The cam rollers 44 are driven in unison similarly to the first embodiment by engines and transmissions (not shown) and by sets of chain and sprocket drives 49 and 50, FIGS. 10 and 11, at respectively opposite sides of the vehicle.

Each of the vehicle sections 40 and 41 is provided with coupling means forwardly and rearwardly in the form of a set of vertically spaced ears 51 and a set of horizontally spaced ears 52, respectively, so that a pivotal coupler 53 can be installed between successive vehicle sections by means of removable coupling pins 54 and 55.

Steering of the vehicle, as made up of two or more of the vehicle sections 40 and 41, is accomplished either from the lead section or the section immediately following, by means of a steering wheel 56 rigidly mounted on a rotatable steering post 57, which rigidly carries a sprocket 58.

The lead vehicle section has its sprocket 58 connected to opposite sides of the front of the following vehicle section by a long sprocket chain 59 trained around idler sprockets 60, while the following vehicle section has its sprocket 58 connected to opposite branches 53a of pivotal coupler 53 by a comparatively short chain 61 trained around idler sprocket 62.

In this embodiment, the cam rollers of each vehicle section are arranged with their protrusive portions 44a in progressive positions, considered longitudinally of the vehicle, to provide at any given time at least two transverse lines of tractive suspension longitudinally of each vehicle section. This is the equivalent of four point tractive suspension for each vehicle section.

It should be noted that, in the embodiment of FIGS. 1–6, one point of tractive suspension is provided at any given time by each of the series 15 of cam members 16.

In some instances it might be desirable to use runners, skiis, wheels, or some other running device for supporting the vehicle and to use one or more of the series of cam members of this invention as strictly a propulsive device, or to use wheels of maximum cam radius in conjunction with and on the same rotative axis as the cam member 16. Moreover, the running peripheral surface of the cam members can be of convex, concave, or straight contour across the widths thereof.

It should be realized that any suitable means may be provided in both embodiments for spring suspension of the running gear and for shock absorption. Thus, as shown in FIG. 6, coil springs 23a are interposed between the cam-member-carrying ends of suspension arms 23 and the frame 21. Although no shock absorbers are shown, a conventional type of same can be mounted similarly to and in conjunction with the springs 23a. No attempt is made to show either springs or shock absorbers in the embodiment of FIGS. 7-11, but it is to be understood that these may be supplied in any suitable manner, if desired.

Likewise, a conventional brake system may be supplied for each embodiment.

The unique operating characteristics of the invention can be readily appreciated from a consideration of the track pattern left by the running gear in soft materials. The pattern comprises a longitudinal series of alternate troughs and ridges, indicating that thrust propulsion is achieved by reaction of the soft material to force exerted against it by the cam members, whereby both a propulsive effect forwardly or backwardly and a lifting effect are achieved.

As previously mentioned the tractive components of the running gear may be wheels equipped with pneumatic tires. This is true whether a number of such wheels are secured together in fixed relationship relative to one another to form a transverse series for use in the embodiment of FIGS. 1-6 or in the embodiment of FIGS. 7-11. Although circular wheels and tires of conventional type can be employed for this purpose within the purview of the invention, provided that the wheels are modified to place their hubs off-center, it will be apparent that the resulting composite, full running, tractive circles effective during travel of the vehicle will be broken at regular intervals and that the ride, on surfaced roads at least, will not be smooth and comfortable. Accordingly, the eccentric wheels and tires of FIGS. 12-16, which are contoured in a manner similar to the cam members 16, are much to be preferred and constitute part of the present invention.

As shown in FIGS. 12-16 eccentric wheels 70, having off-circular, drop center rims 71 configurated in conventional formation for receiving the off-circular beads 72, FIG. 16, of an eccentric off-circular annular, tubeless tire 73, and having axle-receiving hubs 74 of polygonal configuration (or provided with spline-receiving channels) for receiving an axle of mated polygonal (or splined) configuration, are mounted in sets on axles 75, see particularly FIGS. 14 and 15. In this illustrated instance, each set is secured in position on its axle 75 by means of a nut 76 and washer 77, FIG. 12. The hub 74 of the first wheel of the set is next to a shouldered portion 75a of the axle 75, and the hub of the next wheel is next to the hub of the first and so on through the series of wheels of the set. Spacer washers 78 are interposed between adjoining wheel hubs to provide lateral flexing spaces for the tires 73. With this arrangement, the set of wheels is held firmly in place on its axle for rotation therewith under drive impetus or idling, as the case may be, during travel of the vehicle. For a purpose to be explained, air sealing gaskets 79 are interposed between axle shoulder and wheel hub and between spacers and wheels hubs.

Each wheel 70 and tire 73 is preferably of the off-circular formation of cam elements 16 of the first embodiment, so as to provide a protrusive wheel portion 70a and a corresponding protrusive tire portion 73a, as well as a recessive wheel portion 70b and a corresponding recessive tire portion 73b. The arcuate outer or tractive running surface of the protrusive portion of each tire 73 is provided with a suitable, indented, anti-skid tread design 80, but the remainder of the arcuate outer periphery of the tire, i.e. the recessive portion is preferably left smooth, as at 81, without tread design of any kind and preferably surfaced with a smooth and slippery elastomer, as contrasted with a relatively frictional elastomer for the traction surface of the protrusive portions of the tire.

Each tire is fabricated according to customary techniques, except for the shape of the mold and the use of radial reinforcing ply rather than the conventional diagonal ply in most instances. Likewise each tire is mounted on the rim of its wheel and normally inflated in customary manner for a tubeless tire by means of a conventional air valve 82. Although the present wheel construction is unique in providing for retention of air internally thereof in conjunction with a tubeless type of tire, a tube type tire can be utilized if appropriate changes are made in the wheel construction.

A feature of the invention hat may or may not be used in any given instance is to make the wheel itself capable of receiving and retaining air, so as to contribute considerable more buoyancy to the running gear of the vehicle than would otherwise be the case. Thus, as illustrated, each wheel 70 is constructed to provide an extension of the hollow interior of the tubeless tire 73 within the wheel itself. The rims 71 drop to the hub 74 as mutually spaced, imperforate walls 83 which are advantageously reinforced internally by transverse walls 84 and externally by ribs 85. The internal walls 84 terminate short of rim level to provide the drop rim construction required. In this way, the interior of the wheel is closed by the hub 74 and by the lateral walls 83, but otherwise communicates with the interior of the tire. The air inflation valve 82 of conventional valve stem and valve gut construction conveniently extends through a wall 83 and is normally used to supply air under pressure to both the wheel and the tire.

In order to reinflate one or more of the tires 73 without disassembling the complete set on an axle 75, an inflation valve 82, FIG. 14, is provided in the free end of axle 75 in association with inflation passages 86 leading to the periphery of the axle. There is sufficient tolerance between the axle and the wheel hubs, spacers 78, and gaskets 79 (e.g. 0.005") to accept air from inflation passages 86 and conduct it to inflation check valves 87 in the respective wheel hubs. A pressure regulated air hose should be used in the inflation of a low tire of the series so as to not overinflate those tires that are already properly inflated.

With this system, it is also possible to provide for inflating and deflating all tires in common from the inflation valve 82 in the end of axle 75 by removing the inflation check valves 87 from their respective hubs, leaving the receiving openings therefor open.

In order to insure proper balance and alignment of the eccentric tires 73 on their respective, eccentric wheels 70, an index mark 88 is provided on the external surface of a side wall of each tire for registry with a corresponding index mark 89 that is provided at a proper location on the external surface of the rim 71 of each wheel.

Whereas there are here illustrated and described certain specific forms and constructions which I presently regard as the best mode of carrying out the invention, it should be understood that various changes can be made and other forms and constructions adopted without departing from the inventive subject matter particularly pointed out and claimed herebelow.

I claim:

1. In a vehicle for both off-highway and on-highway use, the combination of
   a series of cam members mounted as propulsive running gear on respective eccentric axes of rotation which extend transversely of the direction of travel of the vehicle,
   each of said cam members having a protrusive portion at one side of its axis and a recessive portion at the opposite side,
   the protrusive portion of each cam member having the outermost part of its periphery arcuately formed, the arcuately-formed, outermost parts of the several cam members being disposed at substantially equal distances along a radius from their respective axes to provide successive tractive surfaces arranged progressively about said axes,
   the number of said cam members and their arrangement relative to one another being such that a plurality of said tractive surfaces are bottomed at all times, for vehicle support and propulsion on relatively hard terrain;

the recessive portions of the several cam members providing vehicle support and propulsive thrust in relatively soft and yielding materials;

means rotatably mounting the cam members on their respective eccentric axes, in fixed positional relationship relative to one another;

and drive means for rotating the cam members in unison.

2. A combination as set forth in claim 1, wherein the centers of curvature of the successive tractive surfaces are substantially coincident with the axes of the respective cam members.

3. A combination as set forth in claim 1, wherein the respective rotative axes are longitudinally aligned, end to end, so as to dispose the cam members side-by-side on a common axis, with the successive tractive surfaces encircling said common axis.

4. A combination as set forth in claim 3, wherein there are several of the series of side-by-side cam members arranged one behind another in mutally spaced succession.

5. A combination as set forth in claim 4, wherein the cam members of the several series are so arranged relative to one another with respect to their tractive surfaces that, for any set of two such cam members disposed in tandem, the tractive surface of that cam member which leads in the direction of travel of the vehicle, bottoms first, to provide self-cleaning action for the running gear.

6. A combination as set forth in claim 4, wherein the vehicle includes an undercarriage having a drive housing extending longitudinally of the vehicle; and the means rotatably mounting the cam members comprise suspension arms pivoted to said drive housing and cantilever shafts extending from said arms, the series of cam members being mounted on said shafts, respectively.

7. A combination as set forth in claim 6, wherein the drive means for the cams include sets of sprockets and chains carried by the drive housing and by the suspension arms.

8. A combination as set forth in claim 1, wherein the respective rotative axes and the cam members thereon are arranged one behind another in mutually spaced succession.

9. A combination as set forth in claim 8, wherein the cam members of the series are so arranged relative to one another with respect to their tractive surfaces that, for any set of two such cam members disposed in tandem, the tractive surface of that cam member which leads in the direction of travel of the vehicle, bottoms first, to provide self-cleaning action for the running gear.

10. A combination as set forth in claim 1, wherein each cam member is surfaced by smooth and slippery material except for the tractive surface thereof, which is of frictional material.

11. A combination as set forth in claim 1, wherein the tractive surface of each cam member is provided within an anti-skid tread.

12. A combination tractive and thrust propulsion device, comprising a series of rotary cam members arranged side-by-side with respect to an eccentric axis in common and in fixed positions relative to one another and to said axis;

each of said cam members having a protrusive portion at one side of the axis and a recessive portion at the opposite side, the protrusive portion of each cam member having the outermost part of its periphery arcuately formed, the arcuately-formed, outermost parts of the several cam members being disposed at substantially equal distances along a radius from the axis to provide successive tractive surfaces arranged progressively about the axis, the number of said cam members and their arrangement relative to one another being such that a plurality of said tractive surfaces are bottomed at all times for exerting tractive propulsion, the recessive portions of the several cam members providing thrust propulsion in soft and yielding materials;

and means coincident with said eccentric axis for rotatably mounting the device.

13. A combination tractive and thrust propulsion device in accordance with claim 12, wherein the centers of curvature of the successive tractive surfaces are substantially concident with the axes of the respective cam members.

14. A combination tractive and thrust propulsion device in accordance with claim 12, wherein each cam member is surfaced by smooth and slippery material except for the tractive surface thereof, which is of frictional material.

15. A combination tractive and thrust propulsion device in accordance with claim 12, wherein the tractive surface of each cam member is provided with an anti-skid tread.

16. A combination tractive and thrust propulsion device in accordance with claim 12, wherein the cam members comprise eccentric off-circular wheels and correspondingly eccentric off-circular pneumatic tires mounted on said wheels.

17. A combination tractive and thrust propulsion device in accordance with claim 16, wherein the wheels have drop center rims and are chambered internally in air flow communication with the drop centers of said rims and are otherwise closed against loss of air; wherein the tires are tubeless and have their interiors open to the interiors of said wheels; and wherein means are provided for each wheel and tire combination for introducing air into the wheel and tire in common.

18. A combination tractive and thrust propulsion device in accordance with claim 17, wherein the wheels are provided with respective hubs which are mounted in common on an axle; and wherein the air introducing means comprises air passage means extending along said axle to the several hubs, air passage means extending through the respective hubs from the first-named air passage means to the interiors of the respective wheels; and an accessible inflation valve in communication with said first-named air passage means.

19. A combination tractive and thrust propulsion device in accordance with claim 18, wherein inflation check valves are provided in the respective air passage means that extend through the hubs; and wherein independent inflation means are provided for each tire and wheel combination.

20. A propulsive traction device, comprising a cam body in the form of an eccentric off-circular wheel having a rim; means disposed eccentrically with respect to said body for mounting the latter on an axis of rotation, so that said body has a protrusive portion at one side of said mounting means and of the rotative axis thereof and a recessive portion at the opposite side of said mounting means and of the rotative axis thereof; a correspondingly eccentric off-circular pneumatic tire mounted on said rim; and an arcuate tractive surface along the outermost part of the periphery of the protrusive portion of said pneumatic tire.

21. A propulsive traction device according to claim 20, wherein the center of curvature of the arcuate tractive surface is substantially coincident with the axis of rotation of the cam body.

22. A propulsive traction device according to claim 20, wherein the wheel has a drop center rim and is chambered internally in air flow communication with the drop center of said rim and is otherwise closed against loss of air; wherein the tire is tubeless and has its interior open to the interior of said wheel; and wherein means are provided for introducing air into the wheel and tire in common.

23. A vehicle tire, comprising a pneumatic tire body of eccentric off-circular annular formation adapted for mounting on the rim of an eccentric off-circular wheel and for inflation thereafter, said tire body having side walls and mounting beads; and an index mark permanently applied to a side wall of said tire body adjacent the bead thereof, said mark being adapted to register with a corresponding mark on the rim of said wheel during the mounting of the tire on the wheel.

24. A vehicle wheel of eccentric off-circular shape, comprising an eccentric off-circular, drop center rim; a hub; and a chambered body between hub and rim open to the drop center of said rim but otherwise closed against the loss of air, so the wheel will hold air in common with a tubeless tire mounted on said rim.

25. A vehicle tire, comprising an eccentric pneumatic tire body of off-circular annular formation adapted for mounting on the eccentric rim of a substantially correspondingly off-circular cam wheel of a tractive vehicle, said tire body having a protrusive portion and a recessive portion with respect to the mounting axis of the tire and having side walls and mounting beads of off-circular formation substantially corresponding to the off-circular formation of the tire and defining a wheel-rim-receiving opening of corresponding off-circular formation, the said protrusive portion of the tire body having a running surface extending along the outer periphery of the tire that is formed as an arc of a circle.

References Cited

UNITED STATES PATENTS

| | | | |
|---|---|---|---|
| 2,463,522 | 3/1949 | Davidson | 152—416 |
| 2,751,959 | 6/1956 | Blomquist | 152—416 |
| 2,790,503 | 4/1957 | Kopczynski | 301—5 |
| 3,146,035 | 8/1964 | Bonmartini | 305—34 |
| 3,160,220 | 12/1964 | Goulden | 180—7 |
| 3,168,927 | 2/1965 | Garner | 180—6.48 |
| 3,194,583 | 7/1965 | Nottage | 180—229 |
| 3,204,713 | 9/1965 | Shanahan et al. | 180—6.48 X |
| 3,215,219 | 11/1965 | Forsyth et al. | 180—79.2 |

FOREIGN PATENTS 501,547   3/1939   Great Britain.

LEO FRIAGLIA, *Primary Examiner.*